United States Patent [19]

Chyung et al.

[11] Patent Number: 4,804,643

[45] Date of Patent: Feb. 14, 1989

[54] ZIRCONIA CERAMIC ARTICLE TOUGHENED WITH SIC WHISKERS

[75] Inventors: Kenneth Chyung, Painted Post; Kishor P. Gadkaree, Big Flats; Thomas D. Ketcham, both of Big Flats; Raja R. Wusirika, Painted Post, all of N.Y.

[73] Assignee: Corning Glass Works, Corning, N.Y.

[21] Appl. No.: 42,055

[22] Filed: Apr. 24, 1987

Related U.S. Application Data

[63] Continuation of Ser. No. 875,955, Jun. 19, 1986, abandoned.

[51] Int. Cl.$^4$ .................. C04B 35/48; C04B 35/56
[52] U.S. Cl. ................................. 501/104; 501/95; 501/103
[58] Field of Search ............... 501/88, 95, 103, 104, 501/105

[56] References Cited

U.S. PATENT DOCUMENTS

| | | |
|---|---|---|
| 4,507,224 | 3/1985 | Toibana et al. .................. 501/88 R |
| 4,543,345 | 9/1985 | Wei ................................. 501/95 R |
| 4,657,877 | 4/1987 | Becker et al. .................. 501/105 X |

FOREIGN PATENT DOCUMENTS

| | | | |
|---|---|---|---|
| 9107982 | 6/1984 | Japan ................................. 501/88 |
| 9128273 | 7/1984 | Japan ................................. 501/88 |
| 9137366 | 8/1984 | Japan . | |
| 0954285 | 4/1964 | United Kingdom ................. 501/85 |

OTHER PUBLICATIONS

K. T. Faber et al., "Crack Deflection Processes-I. Theory", Acta Metall, vol. 31, No. 4 (1983), pp. 565–576.
N. Claussen, "Strengthening Strategies for ZrO$_2$-Toughened Ceramics at High Temperatures", Matls. Sci. Eng. vol. 71 (1985), pp. 23–38.
B. A. Bender et al. "Electron Microscopy of Ceramic Fiber-Ceramic Matrix Composites . . . ", Cer. Eng. Sci Proc., vol. 5 (1984), pp. 513'4 529.
N. Claussen, "Tetragonal Zirconia Polycrystals Reinforced with SiC Whiskers", J. Am. Cer. Soc., 69(3) 288–92 (1986).
J. V. Milewski, "Efficient Use of Whiskers in the Reinforcement of Ceramics", Adv. Cer. Metls., vol. 1, No. 1, pp. 36–41 (1986).

Primary Examiner—William R. Dixon, Jr.
Assistant Examiner—Karl Group
Attorney, Agent, or Firm—Kees van der Sterre

[57] ABSTRACT

Whisker-toughened ZrO$_2$ products containing 5–20 volume percent SiC whiskers of relatively low aspect ratio (<20) in a stabilized polycrystalline ZrO$_2$ matrix are provided, exhibiting a room temperature fracture toughness ($K_{IC}$) at least 1.25 times that of the ZrO$_2$ matrix, with relatively low porosity and good strength.

5 Claims, 1 Drawing Sheet

ZIRCONIA CERAMIC ARTICLE TOUGHENED WITH SIC WHISKERS

This is a continuation of application Ser. No. 875,955, filed June 19, 1986, now abandoned.

BACKGROUND OF THE INVENTION

The use of inorganic whiskers and fibers to reinforce glasses, glass-ceramics, sintered ceramics, plastics, and metals has long been practiced. While the distinctions between fibers and whiskers are not always clearly delineated in the literature, whiskers have been characterized as relatively short, single-crystal fibers of small (<100 microns) diameter, normally used as a dispersed phase in a selected matrix. In contrast, fibers are deemed to be multicrystalline or amorphous, and are frequently used in elongated, woven or otherwise interlocking, bundles, tows, or cloth as a reinforcement for a selected matrix.

Extensive study to understand the basic means underlying the strengthening improvement to composite bodies imparted by fibers has indicated the mechanism to be that of load transfer by the matrix to the fibers through shear. This load transfer shifts stress to the relatively long, high modulus fibers, and the fibers may additionally act to impede crack propagation in the matrix.

The basic strengthening mechanism is believed to be the same in whisker-containing composites, but the amount of load transferred by the matrix to the whiskers is dependent upon the length and aspect ratio of the whisker. Hence, in theory, shorter whiskers would not be loaded to the breaking stress and, consequently, full advantage could not be taken of their reinforcing capabilities.

Among the fibers and whiskers which have been demonstrated as reinforcing agents in numerous metal and non-metal matrices are those of silicon carbide (SiC). For example, U.S. Pat. No. 4,324,843 records the formation of SiC fiber reinforced glass-ceramic composite bodies wherein the glass-ceramic matrix is selected from the composition systems of aluminosilicate, lithium aluminosilicate, magnesium aluminosilicate, and combinations thereof. U.S. Pat. No. 4,464,475 discloses the production of SiC fiber reinforced glass-ceramic composite bodies wherein barium osumilite constitutes the predominant crystal phase. U.S. Pat. No. 4,464,192 describes the preparation of SiC whisker reinforced glass and glass-ceramic composite bodies wherein the glass-ceramic matrix is selected from the group of lithium aluminosilicate, magnesium aluminosilicate, aluminosilicate, and combinations thereof.

The above matrices are asserted to be suitable for use temperatures up to about 1300° C. Above that temperature range those compositions are not refractory enough to provide a viscosity sufficiently high to transfer load to reinforcing fibers and whiskers. Consequently, the matrix deforms excessively and the composite suffers loss of load-bearing ability.

For applications requiring strength and stability at very high temperatures, wholly ceramic matrix materials, i.e., crystalline materials free of residual glassy phases, will be needed. These materials are more difficult to reinforce with fibers or whiskers, and the matrix-whisker interactions which govern the properties of the composites are not well understood. Improved dimensional stability has been postulated on the theory that, when dispersed in a crystalline matrix, whiskers will occupy sites along the grain boundaries of the crystals, and could significantly improve the creep resistance of the material. This would be due, for example, to an increase in the length of shear required and/or the added complexity of shear required to yield apparent creep.

It has also been postulated that the high elastic modulus and tensile strength of selected whiskers might enable them to produce composite products demonstrating superior strength-to-weight and stiffness-to-weight properties. For example, whiskers prepared from very stiff, low density covalent compounds such as carbides, nitrides, and oxides can exhibit elastic moduli higher than most metals, and are often many times stronger than steel when considered in proportion to their weight. Of course, the importance of these factors diminishes as matrix ceramics of inherently high elastic modulus are selected for strengthening.

An essential requirement of new ceramic materials for high temperature applications will be toughness, i.e., improved resistance of the material to cracking failure from flaws sustained in use. A material which can exhibit improved resistance to crack growth will provide increased fatigue lifetime and, desirably, a non-catastrophic failure mode which can be easily detected by routine inspection.

The mechanisms of toughening in wholly ceramic matrices have been reviewed by R. W. Rice in "Mechanisms of Toughening in Ceramic Composites", *Ceram. Eng. Sci. Proc.*, 2(7–8) 661–701 (1981). Major strengthening mechanisms for fibers in these ceramics include load transfer, prestressing, crack impediment, crack deflection, and fiber pullout. Also noted, however, is the fact that second phases incorporated in composites for purposes of reinforcement provide many potential sources and preferred paths for localized stresses and crack growth. Thus some composites may have significantly lower compressive strengths than the pure ceramic matrix itself, or may suffer damage under compressive loading which leads to reductions in tensile strength.

Some of these strengthening mechanisms have been the subject of further theoretical analysis. In the case of crack deflection, for example, a theoretical paper by K. T. Faber et al., "Crack Deflection Processes—I. Theory", *Acta Metall.*, 31 (4) 565–576 (1983) suggests that toughening by a factor of four ought to be attainable in crystalline ceramic composites containing small, rod-shaped particles by crack deflection alone, provided sufficient volume fractions of high aspect ratio particles are present. This is of course well beyond the net toughening effect yet observed in any wholly crystalline, whisker-containing ceramic composites produced up to the present time.

$ZrO_2$-based ceramics have been extensively utilized in high temperature applications in the glass and steel processing industries because of the very high refractoriness of this material. However, for the fabrication of structural components in high temperature environments, substantial increases in the toughness of such ceramics i.e., in their resistance to crack propagation under stress, would be required.

The need for tougher $ZrO_2$ and other ceramics for high temperature engineering applications of this nature is discussed in the literature. In "Strengthening Strategies for $ZrO_2$-Toughened Ceramics at High Temperatures", N. Claussen, *Materials Science and Engineering* 71 (1985) 23–38, the author reviews a number of different ceramic systems, and proposes several possible strategies by which high temperature mechanical properties might be improved in these systems. Included among the proposed studies is that of adding SiC and/or $Al_2O_3$ fibers or whiskers to reinforce matrix materials such as mullite, cordierite and tetragonal zirconia bodies.

Improved toughness has been attained in $ZrO_2$-containing composites formed by impregnating SiC fiber roving with partially stabilized zirconia slurries, as reported by B. A. Bender et al in *Ceramic Engineering and Science Proceedings*, 5 (1984) pages 513–529. However, component fabrication by this method is difficult, and the properties of the resulting composites are highly directional.

It had previously been proposed to add relatively large quantities of SiC whiskers to ceramics such as alumina, zirconia, magnesia, ferrites and the like to lower the specific resistance thereof for electric discharge machining. Thus U.S. Pat. No. 4,507,224 describes $ZrO_2$ ceramics containing as much as 50 weight percent of high-aspect-ratio SiC whiskers for this use. However, as noted in U.S. Pat. No. 4,543,345 relating to whisker-toughened $Al_2O_3$ ceramics, no evidence for any toughening effect through the addition of SiC whiskers to $ZrO_2$-based ceramic products had been found.

It is therefore a principal object of the present invention to provide ceramic products made of $ZrO_2$ which exhibit improved toughness for high temperature structural applications.

Other objects and advantages of the invention will become apparent from the following description thereof.

SUMMARY OF THE INVENTION

The present invention provides $ZrO_2$-based products exhibiting improved fracture toughness comprising a matrix phase consisting essentially of $ZrO_2$ and a whisker reinforcement phase consisting of silicon carbide whiskers. The reinforcing whiskers, which may constitute 5–20 volume percent of the product, have a monocrystalline structure with average diameters typically in the range of about 0.5–3 $\mu$m, lengths in the range of about 10–30 $\mu$m, and aspect ratios of less than about 20, e.g., in the range of 3–20. The product exhibits a fracture toughness ($K_{IC}$) at ambient temperatures which is at least 25% in excess of the matrix alone, i.e. 1.25 times the fracture toughness of the sintered whisker-free $ZrO_2$ matrix material.

The whisker-toughened $ZrO_2$ products are produced by hot-pressing mixtures of SiC whiskers and suitable zirconia powders at temperatures in the range of about 1300°–1600° C. and at pressures in the range of about 5–10 Kpsi(Ksi). Product densities of from 80% to greater than 99% of the theoretical maximum for the composition are attainable by this process.

The benefits of whisker toughening according to the invention are particularly useful to provide composites wherein fully or partially stabilized tetragonal zirconia constitutes the predominant zirconia phase (at least 50% by volume). The remainder of the matrix may comprise cubic zirconia, with minor amounts (less that 10 volume percent total) of monoclinic zirconia also being permitted. However, it is additionally possible to provide toughening in unstabilized (monoclinic) zirconia bodies, although the strength of such products is normally significantly lower than that exhibited by stabilized tetragonal zirconia products.

The use of whisker reinforcement falling within the above-recited ranges of dimensions and aspect ratios is particularly important in achieving the objects of the invention. The use of greater proportions of SiC whiskers and/or whiskers having aspect ratios above about 20, as needed for example to attain low specific resistance for electrical discharge machining, risks unacceptable embrittlement and/or weakening of the reinforced material. The reasons for these effects are not fully understood, but the possibilities for whisker interlocking and clumping, and for void retention due to the high flow resistance of the crystalline $ZrO_2$ matrix material at sintering temperatures, certainly increase as the volume fraction and aspect ratio of the whisker reinforcement increase.

DESCRIPTION OF THE DRAWING

The invention may be further understood by reference to the drawing, wherein.

DETAILED DESCRIPTION

Figure 1:
FIG. 1 is a scanning electron photomicrograph of the surface of a whisker-toughened composite article provided in accordance with the invention.

Zirconia powder to be used in the production of toughened zirconia products in accordance with the invention can consist of any of the commercially available fully or partially stabilized $ZrO_2$ powders. Preferably, powders containing $ZrO_2$ together with an effective amount of an incorporated stabilizing ingredient selected from the group of known stabilizers will be selected. Many such stabilizers are known, including, for example, MgO, CaO, $Y_2O_3$, and oxides of rare earth elements selected from the group of La, Ce, Nd, Sm, Gd, Dy, Er and Yb. The particle size of the $ZrO_2$ powder can vary over a relatively large range; powders having average particle sizes in the range of about 0.05–0.5 $\mu$m are quite suitable, although average particle sizes above and below that range could be used.

As previously noted, SiC whiskers having average diameters of 0.5–3 $\mu$m and aspect ratios of less than 20, preferably about 3–20, can be suitably employed in the production of toughened products in accordance with the invention. Whiskers of these dimensions are commercially available from a number of sources. They are normally supplied in dry bulk, and are somewhat susceptible to clumping, but can be dispersed in liquid media such as water, lower alcohols, or the like for mixing with zirconia powders.

The preparation of a homogeneous dispersion of SiC whiskers in $ZrO_2$ powders is most conveniently accomplished by blending them together in a liquid medium such as water or a water-alcohol mixture. Preferably, the whiskers are first dispersed in the liquid and blended at high speed to break up whisker clumps and obtain thorough wetting of the whiskers. Thereafter, the zirconia powder is added to the whisker dispersion with continued high-speed blending to obtain the homogeneous whisker-powder dispersion.

Difficulty can be encountered in forming a green whisker-powder preform wherein a homogeneous distribution of whiskers in the powder is retained. This is attributed to differential settling rates for the powder and the whiskers from the suspending liquid. Failure to compensate for or avoid this factor can result in layering or other concentrations of whiskers in the $ZrO_2$ matrix, leading to non-uniform physical properties. Rapid liquid removal from the stirred dispersion, as by vacuum filtering, provides a suitable way to minimize the formation of undesirable whisker concentrations in the green preform.

Hot-pressing conditions utilized to sinter the green composite to a unitary product should be at a temperature and pressure sufficient at least to reduce the final porosity below about 20%. Best strength values will be attained as product density approaches 99% of the theoretical maximum for the composite material.

Useful temperatures for this purpose are typically in the range of about 1300°-1600° C., depending upon powder composition and whisker content. Consolidation pressures in the range of about 1-10 Ksi are useful to achieve the desired density, although lower and higher pressures may be used if desired. As is conventional, consolidation is best carried out under vacuum to minimize the retention of voids in the product.

The invention may be further understood by reference to the following detailed examples, which are intended to be illustrative rather than limiting.

EXAMPLE I

A quantity of $ZrO_2$ powder consisting essentially of partially stabilized tetragonal $ZrO_2$ containing 2.5 mole percent $Y_2O_3$ and the remainder $ZrO_2$, is provided for processing. This powder has an average particle size of about 0.1 microns.

The powder is added with constant blending to an aqueous suspension of SiC whiskers in a proportion such that the final solids content of the suspension comprises 20 volume percent SiC whiskers and the remainder $ZrO_2$ powder. The whisker suspension is prepared by adding a quantity of SiC whiskers, commercially available as SC-9 whiskers from the Arco Metals Co., to a water vehicle in a Waring blender, with blending at high speed for 5 minutes prior to adding $ZrO_2$ to obtain thorough dispersing of the whiskers in the suspension. These whiskers have diameters in the range of about 1-3 microns, lengths of 10—30 microns, and an aspect ratio of less than about 20.

The resulting whisker-powder suspension is filtered to remove water and the filter cake, having a thickness of about 0.25 inches, is loaded into a 2-inch-diameter graphite hot pressing die. The die and sample are then loaded into a hot press and the pressing chamber is evacuated for two hours at room temperature.

After the pressing chamber has been evacuated, the die is loaded to approximately 2 Ksi and the temperature is increased to about 1300° C. over a heating interval of about 80 minutes. The pressure on the die is then increased to about 8 Ksi over an interval of about 3 minutes, maintained for about 1 minute, and then released. The die is then cooled to room temperature and a consolidated disc consisting of the whisker-containing $ZrO_2$ is removed therefrom and inspected.

Examination of the consolidated disc indicates that a density of approximately 80% of the theoretical maximum has been achieved within the relatively short pressing interval employed. Bars cut from the sample exhibit a modulus of rupture strength of approximately 20 Ksi, evidencing significant whisker strengthening given the substantial fraction of porosity retained in the material. Optical microscope examinations of polished cross-sections of the sample indicate a $ZrO_2$ grain size below 1 micron, with some indication of whisker pullout from the polished surface of the product.

EXAMPLE II

The procedure of Example I is repeated except that the whisker-$ZrO_2$ powder filter cake is hot-pressed for 1 hour at 1400° C. and 8 Ksi, rather than only briefly at 1300° C. as in Example I.

The consolidated disc resulting from the hot-pressing procedure is examined by optical microscopy and tested for physical properties. Optical examination indicates that the porosity of the sample is about 5%, with some porosity evidently being attributable to SiC whisker clumping rather than incomplete $ZrO_2$ sintering.

The elastic modulus of the material is found to be about 32.1 Mpsi. Sample bars of the material, when tested to failure in 3-point bending on an Instron Model 1122 testing machine, yield an average modulus of rupture strength of approximately 93,300 psi The toughness ($K_{IC}$) of the whisker-reinforced $ZrO_2$ material is measured by indentation testing, being calculated from indentation crack propagation analysis using the expression:

$$K_{IC} = A(C_o)^{(-3/2)}(E)^{(\frac{1}{2})}(P)^{(\frac{1}{2})}d$$

wherein:
  A = 0.011
  P = indentation load
  $C_o$ = crack length
  E = elastic modulus and
  d = indent diagonal length For the measurements hereinafter reported, an indentation load of 2 kg or 5 kg is used, and the elastic modulus of all materials is assumed to be 200 GPa (29 Msi).

Samples of the material produced in accordance with Example II exhibit fracture toughness values as calculated from the above expression of about 4.4 MPa.m$^{\frac{1}{2}}$. In contrast, samples of the partially stabilized $ZrO_2$ powders alone, hot-pressed at 1150° C. and 8 Kpsi for 1 hour, yielded an average fracture toughness value of 3.5 MPa.m$^{\frac{1}{2}}$ and did not exceed strengths of about 40 Ksi. When hot pressed at temperatures between 1410°-1425° C. for 1 hour at 6-8 Ksi, the powder alone yielded modulus of rupture strengths averaging 30,000 psi, although one sample hot-pressed at 1425° C. for 1 hour at 6 Ksi exhibited a strength in excess, of 48,000 psi.

FIG. 1 of the drawing consists of an electron photomicrograph of a surface indentation in a sample of the above-described material, wherein the white bar represents a dimensions of 10 microns. The SiC whiskers present in the material and the rather limited extent of cracking induced by the surface indentation can be observed in this micrograph.

Examination of the whisker-containing material of this Example by X-ray diffraction shows no detectable monoclinic $ZrO_2$. Thus transformation toughening effects are not believed to play a significant role in the toughening observed in these materials.

EXAMPLE III

The procedure described in Example I is followed to produce a SiC-whisker-reinforced $ZrO_2$ product utilizing a different partially stabilized zirconia powder. This powder, commercially available as TZ-3Y powder from the Toyo Sode Manufacturing Co., Ltd., of Tokyo, Japan, contains 3 mole percent of $Y_2O_3$ as a stabilizer, rather than 2.5 mole percent $Y_2O_3$ as for the powder utilized in Example I.

The procedure utilized to provide the whisker-powder suspension of Example I is followed except that, in place of the water vehicle, a vehicle consisting of 75 volume percent H₂O and the remainder isopropyl alcohol is employed. Repeated dispersion and filtering are used in order to improve the homogeneity of the 20% (volume) dispersion of whiskers in the $ZrO_2$ matrix.

The filter cake thus provided is hot pressed at 1450° C. for 2 hours at 6 Ksi, and then cooled to room temperature and examined. The cake processing and hot-pressing conditions employed do not result in complete pore closure in the green cake, the porosity of the sintered whisker-containing product being estimated to be in the range of 1-4%. Nevertheless, the material exhibits a modulus of rupture strength of approximately 70,000 psi in room temperature three-point bending tests. The toughness of the material ($K_{IC}$), determined as described in Example II, averages about 5.1 MPa.m$^{\frac{1}{2}}$ with a high value of about 6.4 MPa.m$^{\frac{1}{2}}$.

Figure 2:
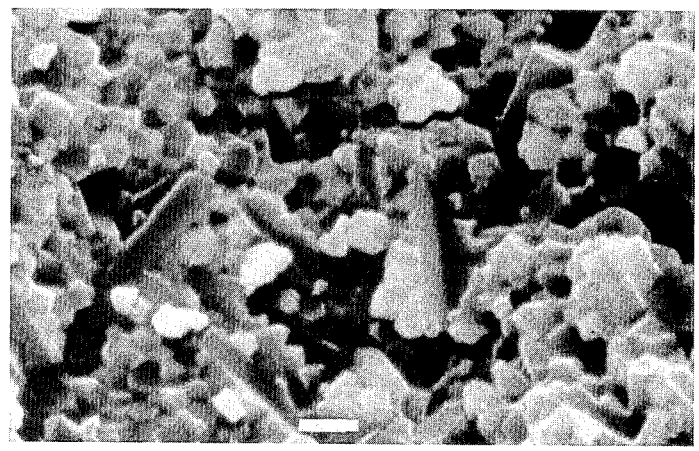
FIG. 2 is an electron photomicrograph of a fractured surface of a whisker-toughened composite material.

Additional modulus of rupture samples of material prepared in accordance with this example, when given a smooth surface finish, exhibit modulus of rupture strengths of approximately 120,000 psi. FIG. 2 of the drawing consists of a photomicrograph of a fracture surface of such a sample after breakage in three-point bending, wherein the white bar represents a dimension of 1 micron. The micrograph indicates that whisker pull-out as well as whisker breakage occur at failure, suggesting the former may be a factor contributing to the toughness enhancement which is observed.

The observed toughness values substantially exceed the values obtained for the consolidated, partially stabilized zirconia powder alone. Consolidated whisker-free $ZrO_2$ samples prepared from a methanol dispersion of the powder by hot-pressing at 1450° C. for 2 hours at 6 Ksi exhibited an average toughness of 3.4 MPa.m$^{\frac{1}{2}}$. These samples were completely consolidated (>99% of theoretical maximum density) and had modulus of rupture strengths exceeding 100 Ksi.

In following the procedures described in the above illustrative examples, it was determined that excessive hot-pressing temperatures can result in a deterioration of physical properties in the resulting composite whisker-powder samples. A composite sample produced in accordance with Example III above, but hot pressed to 1700° C. instead of 1450° C., appeared to exhibit cracking at the whisker-$ZrO_2$ interface, and demonstrated low hardness. This was attributed to the development of monoclinic $ZrO_2$ in the body, and also to some sample interaction with the graphite die.

As previously noted, it is particularly important to avoid excessive loading of the $ZrO_2$ matrix material with whisker reinforcement and the use of SiC whiskers of excessively high aspect ratios. Whisker loadings above about 20 volume percent (about 13 weight percent) are not only uneconomical, but risk unacceptable strength deterioration and loss of the 25% toughness enhancement attainable in accordance with the present invention.

We claim:

1. A ceramic composite characterized by improved fracture toughness comprising a matrix phase consisting essentially of tetragonal $ZrO_2$ and a $ZrO_2$ stabilizer selected from the group consisting of MgO, CaO, $Y_2O_3$, and oxides of rare earth elements from the group: La, Ce Nd, Sm, Gd, Dy, Er and Yb and a whisker reinforcement phase constituting 5-20 volume percent of the composite and consisting of silicon carbide whiskers, the whiskers having a monocrystalline structure, a diameter in the range of 0.5-3 μm, a length in the range of 10-30 μm, and an aspect ratio not exceeding about 20, the composite exhibiting a fracture toughness ($K_{IC}$) at 25° C. at least 1.25 times the fracture toughness of the matrix phase when free of said whisker reinforcement phase.

2. A ceramic composite in accordance with claim 1 wherein the matrix phase consists essentially of tetragonal $ZrO_2$ containing 1-5 mole percent total of a $Y_2O_3$ stabilizer.

3. A method for making a ceramic composite characterized by improved fracture toughness which comprises the steps of:
   (a) mixing SiC whiskers with a $ZrO_2$ powder consisting essentially of a combination of $ZrO_2$ with a stabilizer selected from the group consisting of MgO, CaO, $Y_2O_3$, and rare earth oxides of elements selected from the group: La, Ce, Nd, Sm, Gd, Dy, Er and Yb to provide a mixture wherein the SiC whiskers do not exceed 20 volume percent of the total solids content of the mixture, and wherein the whiskers have average diameters in the range of 0.5-3 μm, lengths of 10-30 μm, and aspect ratios not exceeding 20; and
   (b) hot-pressing the mixture of SiC whiskers and $ZrO_2$ powder at a temperature in the range of about 1300°-1600° C. and at pressures in the range of about 5-10 Ksi, thus to provide a consolidated ceramic composite comprising SiC whiskers in a matrix consisting essentially of $ZrO_2$ and a stabilizer selected from the group consisting of MgO, CaO, $Y_2O_3$, and rare earth oxides of elements selected from the group: La, Ce, Nd, Sm, Gd, Dy, Er and Yb, said composite having a density of at least 80% of theoretical maximum and a fracture toughness ($K_{IC}$) at least 1.25 times the toughness of the matrix when free of the SiC whiskers.

4. A method in accordance with claim 3 wherein the matrix consists essentially of $ZrO_2$ containing 1-5 mole percent total of $Y_2O_3$ as a stabilizer.

5. A ceramic composite article made in accordance with claim 4.

* * * * *